United States Patent [19]

Meyer

[11] Patent Number: 4,730,773

[45] Date of Patent: Mar. 15, 1988

[54] ACCESS ASSEMBLY FOR UNDERGROUND IRRIGATION SYSTEMS AND ACCESSING ASSEMBLY COOPERABLE THEREWITH

[75] Inventor: Larry P. Meyer, Walla Walla, Wash.

[73] Assignee: Nelson Irrigation Corporation, Walla Walla, Wash.

[21] Appl. No.: 871,374

[22] Filed: Jun. 6, 1986

[51] Int. Cl.⁴ ............................................. B05B 17/04
[52] U.S. Cl. ........................................ 239/1; 239/201; 239/210; 239/570; 239/583; 137/15; 251/149.5; 251/149.9
[58] Field of Search ..................... 239/1, 200, 201, 202, 239/207, 210, 570, 583; 137/15, 614.06; 251/61.4, 149.5, 149.9

[56] References Cited

U.S. PATENT DOCUMENTS

| 660,789 | 10/1900 | Doble | 239/583 |
|---|---|---|---|
| 1,762,503 | 6/1930 | Buckner | 239/201 |
| 1,855,264 | 4/1932 | Thompson | 239/201 |
| 3,266,768 | 8/1966 | Muschett | 251/149.5 |
| 3,472,482 | 10/1969 | Gardner | 251/149.5 |
| 3,559,887 | 2/1971 | Meyer . | |
| 3,744,720 | 7/1973 | Meyer . | |
| 3,973,752 | 8/1976 | Boelkins | 251/149.9 |
| 4,153,202 | 5/1979 | Meyer . | |
| 4,222,411 | 9/1980 | Herzan et al. | 251/149.9 |
| 4,271,865 | 6/1981 | Galloway et al. | 251/149.9 |
| 4,359,066 | 11/1982 | Hunt | 251/149.9 |
| 4,468,225 | 8/1984 | Tchéraz | 251/149.9 |

FOREIGN PATENT DOCUMENTS

| 613328 | 1/1961 | Canada | 251/61.4 |
|---|---|---|---|
| 793980 | 4/1958 | United Kingdom | 251/61.4 |

Primary Examiner—Andres Kashnikow
Assistant Examiner—Michael J. Forman
Attorney, Agent, or Firm—Cushman, Darby & Cushman

[57] ABSTRACT

Apparatus for enabling a sprinkler head assembly to be detachably mounted on an irrigation system riser pipe containing water under pressure in accessed relation to the water under pressure within the riser pipe. The apparatus comprises an access assembly adapted to be rigidly secured to the riser pipe and an accessing assembly adapted to be rigidly secured to the sprinkler head assembly. The access assembly includes separate main and pilot pressure valve mechanisms containing the water under pressure within the riser pipe. Both assemblies include detachable interengaging connectors for establishing a mechanical connection between the two assemblies by a simple and convenient manual movement. The accessing assembly includes a quick connection fitting for accessing the water under pressure through the pilot pressure valve mechanism which is mounted in a cooperating quick connection fitting. The accessing assembly includes an operating mechanism movable in response to the communication of pilot water under pressure therewith to open the main valve mechanism and provide water pressure rigidification to the mechanical connection between the two assemblies.

44 Claims, 9 Drawing Figures

ACCESS ASSEMBLY FOR UNDERGROUND IRRIGATION SYSTEMS AND ACCESSING ASSEMBLY COOPERABLE THEREWITH

This invention relates to sprinkler irrigation and more particularly to improvements in sprinkler irrigation of relatively large areas such as agricultural fields, athletic fields, golf courses and the like.

Existing practices for irrigating relatively large turf or sod areas such as athletic fields and/or gold courses involves the installation of underground pipe systems. The characteristic which distinguishes these underground systems from a typical residential underground lawn system is that the sprinkler head must be of relatively large capacity when compared with the sprinkler head used in a typical underground lawn sprinkler system. Sprinkler heads of a relatively small capacity can be mounted so as to function with a pop-up capability. On the other hand, where large areas of turf are to be sprinkled, it is not practical to provide a number of small sprinkler heads but instead the practice is to utilize relatively larger capacity sprinkler heads, each of which is capable of covering a pattern area of considerably greater diameter than the pop-up type sprinkler heads used in a typical underground lawn sprinkler system. In a typical smaller underground lawn sprinkler system, there are provided a number of outlets each of which is provided with a permanently attached pop-up sprinkler head. The system is operated by communicating water under pressure to predetermined outlets while the water is shut off with respect to the others. In contrast, a typical large area underground system embodies a plurality of outlets which are spaced apart a distance substantially greater than the spacing in the smaller systems. In addition, each outlet has permanently connected therewith a valve assembly rather than a pop-up sprinkler head. Each valve assembly is adapted to cooperate in a quick connecting and disconnecting manner with a coupler connected with a larger capacity sprinkler head.

A typical valve assembly includes a housing structure which provides a chamber having an inlet communicating therewith, an outlet communicating therewith and a valve normally closing the outlet capable of being moved into an open position to communicate the chamber with the coupler. Typically, these housing structures are permanently fixed to the top of a riser pipe so that the water under pressure is communicated with the chamber through the inlet of the housing structure. Control of the water under pressure to the housing structure is provided by a separate line valve.

The typical coupler assembly includes a housing structure having an outlet. The sprinkler head is connected with the housing structure in a relationship such that the outlet of the housing structure communicates with the sprinkler head. The coupler also includes a portion which is adapted to move the valve of the access assembly off its seat and provide for fluid communication between the valve assembly and the coupler.

The coupler and valve assembly are provided with quick coupling elements which enable the same to be interconnected by a turning action of the coupler of one turn or less with respect to the housing structure. Usually the quick coupling elements are essentially a bayonet type connection requiring the housing structure of the coupler to be first moved longitudinally with respect to the housing structure of the valves assembly and then rotationally. The relative longitudinal movement is used to unseat the valve and the rotational movement is used to lock the two structures against reverse longitudinal movement. It is noted however that the valve in the valve assembly is opened before the actual locking takes place.

In the systems described above the usual sprinkler head assembly employed is of the rotary step-by-step impact type. In systems where higher capacity sprinkler heads are required, rotary step-by-step impulse sprinkler head assemblies are used. The usual situation is to connect these higher capacity units rigidly on the riser pipe with the use of a latching band assembly rather than to use a manually operable quick coupling arrangement, such as provided by prior art couplers and valve assemblies. A rigid connection can only be effected when the water pressure to the riser is turned off. A rigid connection for the higher capacity impulse type sprinkler heads is desirable because of the greater forces which are imposed upon the connection by the greater energy level in the water being controlled and because the impulse action creates forces which likewise are transmitted to the connection which is not the case with respect to impact type sprinkler heads.

The existence of this state of the art from a commercial availability standpoint presents a peculiar problem in the case of athletic fields of the type including an oval track surrounding a football area or soccer area. Existing impact sprinkler head arrangements require the installation of one or more than one outlets actually on the playing area in order to provide adequate uniform water coverage. The existence of one or more outlets actually on the playing area is highly undesirable because of the potential for injury to the players utilizing the area for practice and games. While the existing larger size impulse sprinkler head assemblies could be utilized to effect coverage without the necessity of placing an outlet on the playing area, the need to provide for a fixed connection between each riser pipe provided and the sprinkler head assembly utilizing it presented an effective barrier to the wide spread use of existing commercial impulse sprinkler head technology to solve the problem of on-field outlets presented by the existing commercial impact sprinkler head technology.

It is an object of the present invention to overcome the aforesaid barrier to the utilization of larger capacity sprinkler heads and to thereby solve the problem of on-the-field outlets presented by the existing utilization of intermediate capacity sprinkler heads. In accordance with the principles of the present invention, the underlying concept for achieving this objective is to provide access and accessing assemblies which are capable of being initially mechanically coupled by a simple convenient manual operation and thereafter are capable of utilizing the energy of the water under pressure contained by the access assembly to rigidify the mechanical connection and to provide for the opening of the main valve so as to accomplish fluid communication. In accordance with the principles of the present invention, the access assembly for carrying out the aforesaid concept includes an access structure providing (1) a chamber for containing water under pressure, (2) an inlet for communicating with the chamber (3) a main access outlet for communicating with the chamber, and (4) a pilot pressure outlet for communicating with the chamber. A threaded section on the access structure enables the same to be fixedly mounted on the riser pipe in a relationship such that the inlet is in communication with water under pressure within the riser pipe. A main valve is mounted with respect to the main outlet for movement between (1) a closed access position preventing water under pressure within the chamber from flowing through the main outlet and (2) an opened accessed position enabling water under pressure within the chamber to flow through the main outlet. A pilot pressure valve is mounted with respect to the pilot pressure outlet for movement between (1) a closed inoperative position preventing water under pressure within the chamber from flowing through the pilot pressure outlet and (2) an opened operative position enabling water under pressure within the chamber to flow through the pilot pressure outlet.

In accordance with the principles of the present invention, the accessing assembly for carrying out the aforesaid concept includes an accessing structure providing a sprinkler head outlet. A threaded section on the accessing structure enables a sprinkler head assembly to be secured on the accessing structure in a relationship such that the sprinkler head outlet is communicated with the sprinkler head assembly. A pair of main detachable interengaging coupling means are operatively associated between the access and accessing structures for enabling the accessing structure to be conveniently manually secured on the access structure in a relationship such that access to water under pressure within the chamber can be obtained by movement of the main valve into its opened position. An operating mechanism is mounted on the accessing structure for movement from an inoperative position into an operative position in response to the communication of water under pressure therewith to thereby effect movement of the main valve into its open position and establish communication of water under pressure from the chamber with the sprinkler head outlet through the main outlet. A water pressure communicating system is provided for communicating a source of water under pressure with the operating mechanism so as to effect movement thereof from its inoperative position into its operative position. A separate pair of detachable interengaging coupling means are provided for conveniently manually effecting a securement of the water pressure communicating system in communicating relation with the pilot pressure outlet so that access to water under pressure within the chamber can be obtained for communication with the water pressure communicating system when the pilot pressure valve is in its opened position.

Preferably, the operating mechanism is operable when moved into its operative position to not only effect the opening of the main valve but to effect a water pressure rigidified securement between the access and accessing structures in addition to the mechanical securement provided by the main detachable interengaging coupling elements. Thus, by this feature it is possible to effect by a simple manual procedure an initial mechanical connection between the access and accessing structures which is intensified by extraneous energy and hence is not limited in its effectiveness by the extent of the manual energy imparted in effecting the connection. Moreover, by separately utilizing the pilot water under pressure to fully accomplish the main valve opening function it becomes possible to fully accomplish an initial mechanical connection of the sprinkler head assembly in a condition to receive the water under pressure before the actual communication of the water under pressure takes place.

To illustrate how this subject matter breaks down the barriers of inconvenience heretofore provided with respect to existing commercial impulse sprinkler head technology, a typical installation for an athletic field having a football playing area within an oval track involves an underground piping system providing eight riser pipe outlets, four on each side of the field outside the football playing area. By utilizing the assemblies of the present invention, a system can be provided by the permanent installation of eight access assemblies at ground level on the eight riser pipes. The number of accessing assemblies and sprinkler head assemblies utilized in the system is determined by the water pressure input capability. Significantly, the system is operable with the utilization of only one accessing assembly and connected sprinkler head assembly. The underground system requires only a single master control valve for the entire system and does not require a control valve for each of the eight riser pipe. Where only a single accessing assembly and connected sprinkler head assembly is utilized, it becomes possible to easily and conveniently accomplish the movement of the sprinkler head assembly with its attached accessing assembly from one riser pipe to the next without the necessity of actuating the main control valve to close off the system. This convenience is made possible by virtue of the quick coupling elements which serve to provide for the communication of pilot pressure from within the chamber of the access structure to the water pressure communicating system of the accessing assembly. Thus, in disconnecting an already connected accessing assembly from an access assembly, the disconnection of these quick coupling elements by a simple manual effort results in eliminating the water pressure rigidified securement between the access and accessing structures and the closing of the main valve while the access and accessing structures remain mechanically secured by the main detachable interengaging coupling elements. This function enables the operator to effect final disengagement by another simple and convenient manual operation. Likewise, the connection of the accessing assembly with the next access assembly is accomplished by the reverse procedure which involves again only a minimal and convenient manual movement wih a final water pressure rigidification and main valve opening. It will also be noted that rather than utilizing a single accessing assembly for moving a single sprinkler head to the eight access assemblies provided, where the source capacity permits, two accessing assemblies for two sprinkler head assemblies may be utilized. Conveniently, one would be utilized on one side of the field and the other on the other side.

Another object of the present invention is the provision of an access assembly of the type described which provides not only for the main valve access capability but an additonal pilot pressure valve access capability as well.

Another object of the present invention is the provision of an accessing assembly of the type described which is provided with a water pressure communicating system for actuating an operating mechanism movable in response to the communication of water under pressure therewith to perform a desirable function in the system such as, for example, opening the main valve and/or providing a water pressure rigidified securement between the access and accessing structure.

Still another object of the present invention is the provision of an accessing assembly of the type described which is simple in construction, effective in operation and economical to manufacture.

These and other objects of the present invention will become more apparent during the course of the following detailed description and appended claims.

The invention may best be understood with reference to the accompany drawings wherein an illustrative embodiment is shown.

Figure 1:
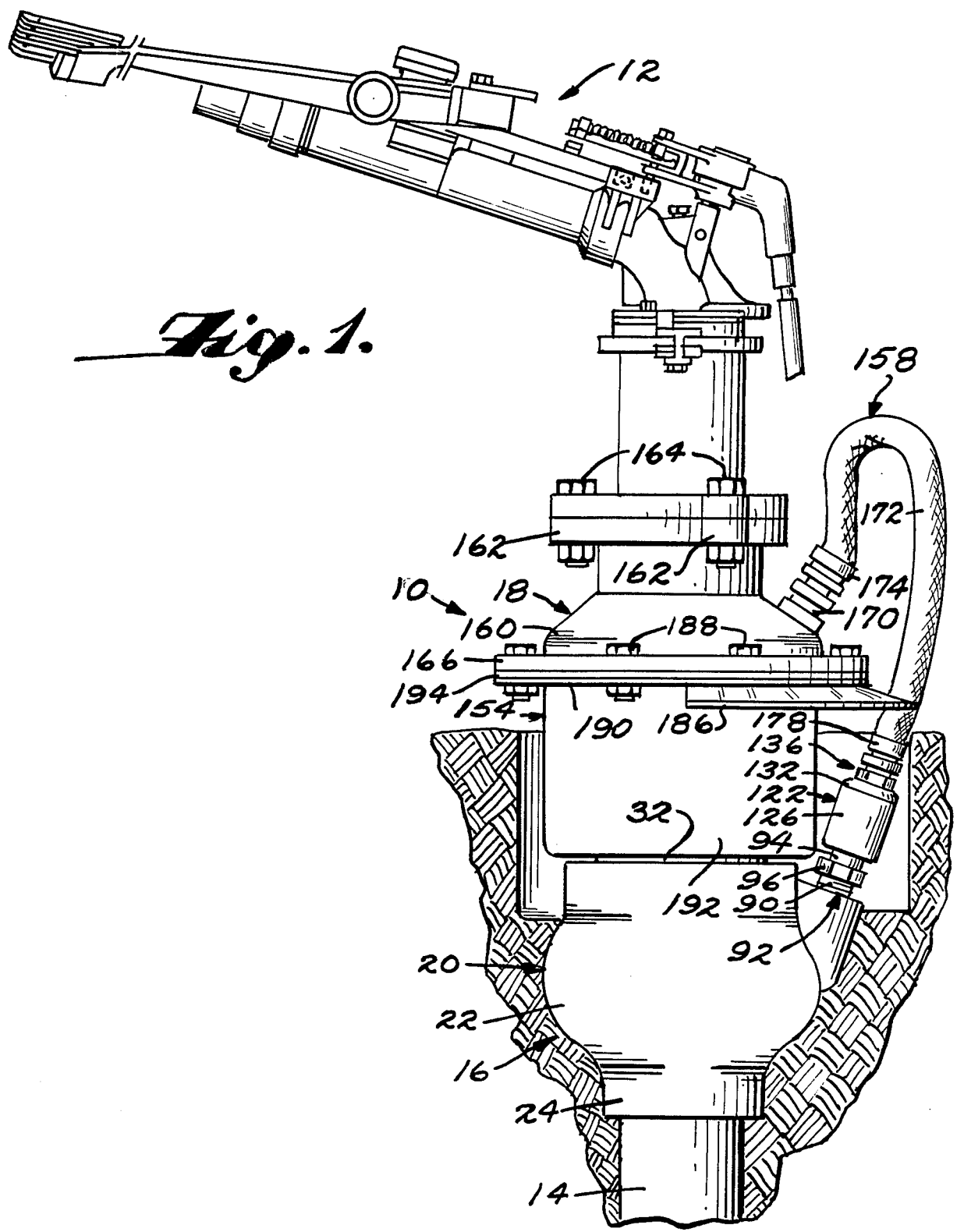
FIG. 1 is a side elevational view of an apparatus embodying the principles of the present invention showing the assemblies of the apparatus in their operative positions.

Referring now more particularly to the drawings, there is shown therein an apparatus, generally indicated at 10, for enabling a sprinkler head assembly, generally indicated at 12, to be detachably mounted on an irrigation system riser pipe, indicated at 14, containing water under pressure. The apparatus 10 is constructed in accordance with the principles of the present invention and, in general, includes an access assembly, generally indicated at 16, which is adapted to be rigidly connected to the riser pipe 14 and an accessing assembly, generally indicated at 18, which is adapted to be rigidly connected with the sprinkler head assembly 12.

While the apparatus 10 may be utilized with respect to any irrigation system riser pipe, a preferred irrigation system which will be described hereinafter (see FIG. 8) as illustrative is an underground system for an athletic field of the type having an oval track defining therein a football playing area. In the illustrative irrigation system, each one of eight riser pipes is provided with an access assembly 16 constructed in accordance with the principles of the present invention. Of course, more than one sprinkler head assembly with attached accessing assembly 18 could be utilized. For example, a convenient number would be one such pair of interconnected assemblies for each side of the field cooperating with the four access assemblies 16 on that side of the field.

For the exemplary system noted above, it is necessary to utilize one or more high capacity sprinkler heads in order to insure that the system will provide uniform coverage without the necessity of providing a riser pipe and access assembly within the football playing area. Examples of high capacity sprinkler heads of the type herein contemplated are disclosed in the following U.S. Pat. Nos. 3,559,887, 3,744,720, 4,153,202, and commonly assigned application Ser. No. 726,382 filed Apr. 23, 1985. It will be understood that while the higher capacity impulse type sprinkler heads are contemplated for use in the exemplary irrigation system noted above, the apparatus 10 of the present invention is equally applicable with other smaller types of sprinkler heads such as impact sprinklers and the like in other irrigation systems.

Figure 2:
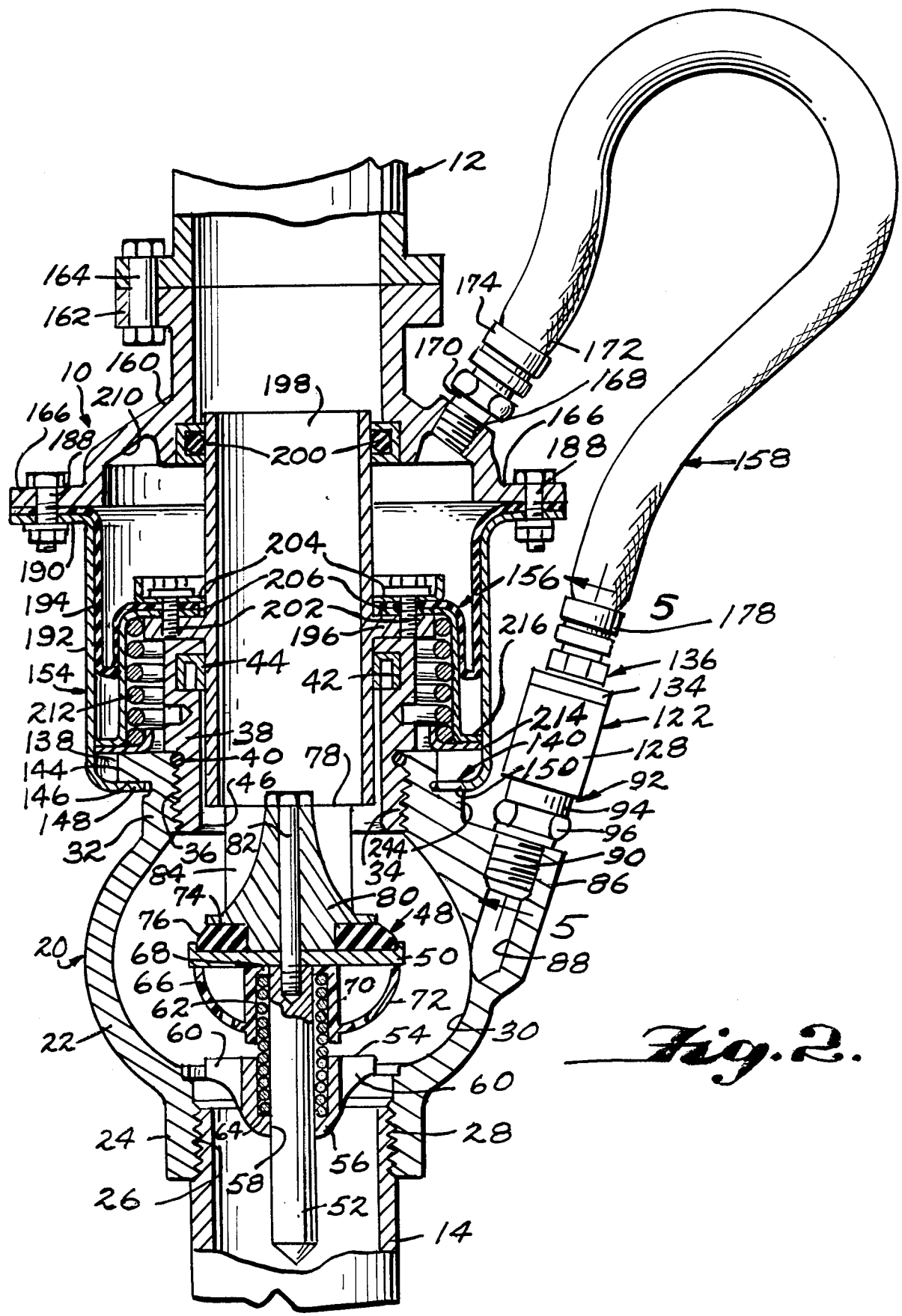
FIG. 2 is an enlarged fragmentary vertical sectional view showing the access and accessing assemblies of the present apparatus in their operative positions.
Figure 3:
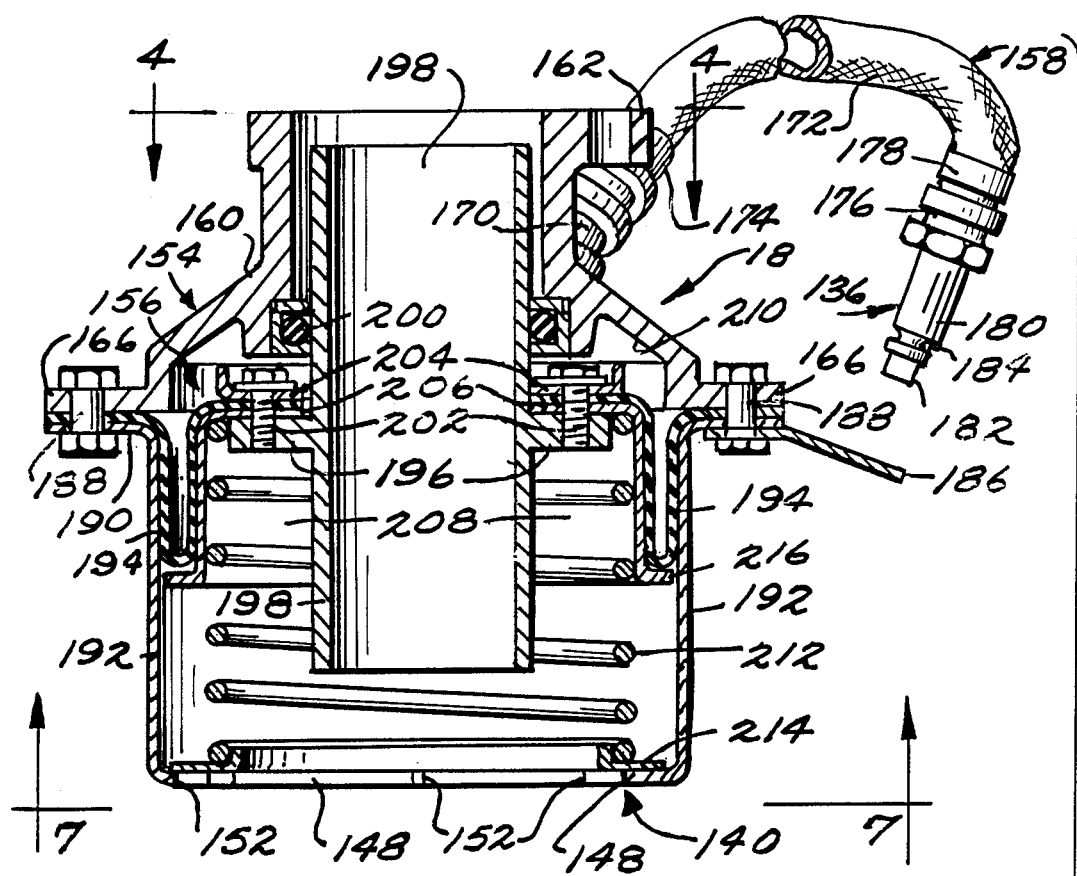
FIG. 3 is a view similar to FIG. 2 showing the access and accessing assemblies separated.
Figure 3:
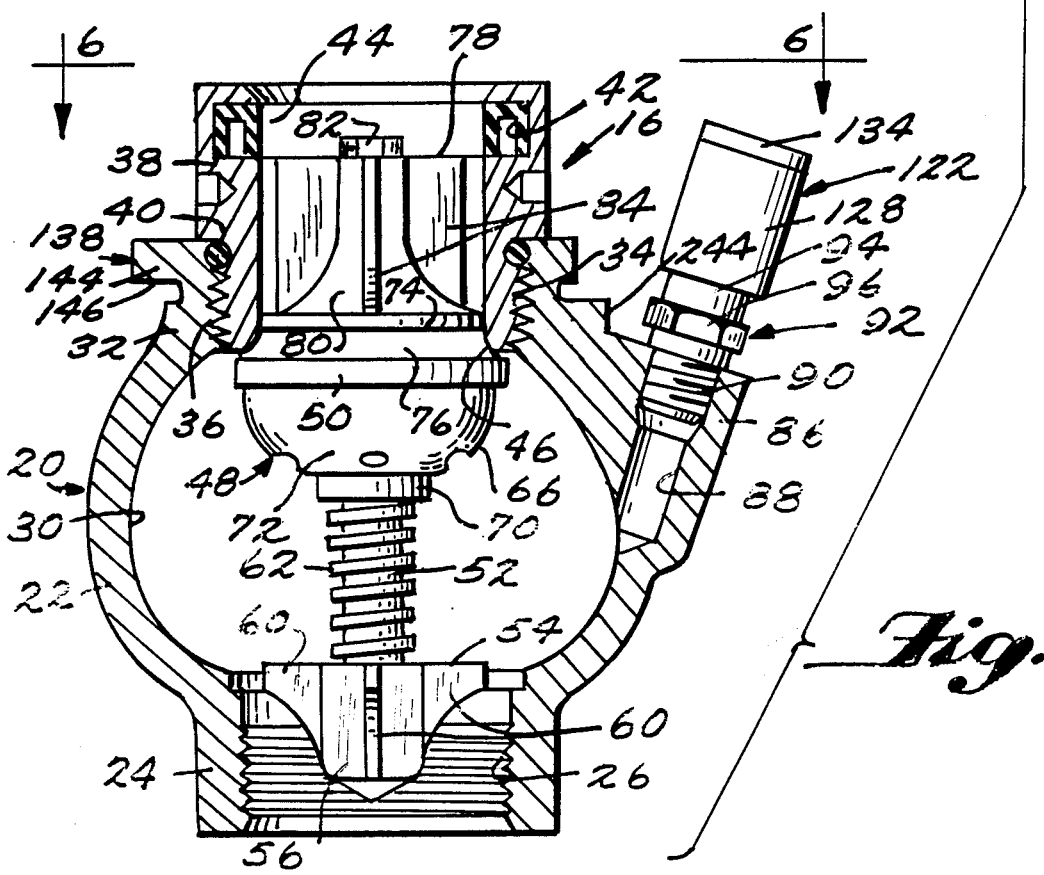
Figure 4:
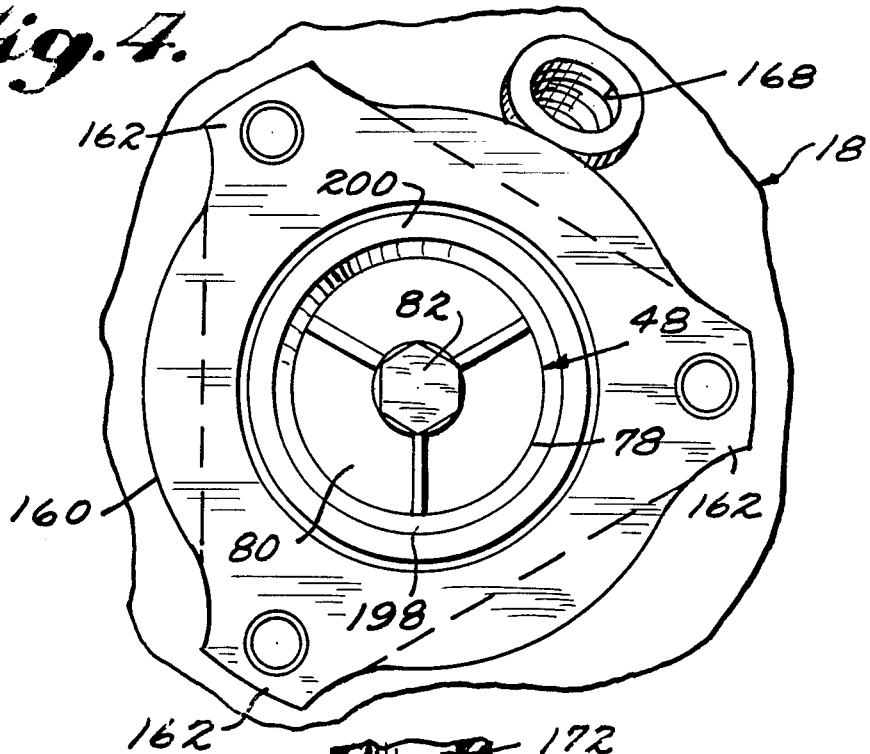
FIG. 4 is a fragmentary top plan view of the access and accessing assembies taken along the line 4—4 in FIG. 3 with the hose line removed.

Referring now more particularly to FIGS. 1-3, the access assembly 16 preferably comprises an access structure, generally indicated at 20, which includes a main housing member 22. The housing member 22, as shown, is in the form of a metal casting. It will be understood that other methods of making the housing member and other materials for making the same may be utilized. As shown, the housing member 22 includes a lower tubular portion 24 which is interiorly threaded, as indicated at 26, so as to be fixedly secured on the usual exterior threads 28 of the riser pipe 14. The lower lower tubular portion 24 provides an inlet for the water under pressure within the riser pipe 14 which inlet leads to a main chamber provided by a central globular portion 30 of the housing member 22. The housing member 22 also includes an upper tubular portion 32 which is interiorly threaded, as indicated at 34, so as to be meshingly engaged with exterior threads 36 formed on a tubular member 38 forming a part of the rigid access structure 20. As shown, there is an O-ring seal 40 provided between the tubular portion 32 of the housing member 22 and the tubular member 38 at a position outwardly of the threads 34 and 36 so as to insure that the threaded connection is water tight. The tubular member 38 extends above the tubular portion 32 and its interior periphery adjacent its upper end is formed with an annular groove 42 for receiving a pressure activated annular seal 44 of inverted U-shaped cross-sectional configuration. The lower end of the tubular member 38 is shaped to define an annular main valve seat 46. The interior periphery of the tubular member 38 above the valve seat 46 provides a main outlet for the internal chamber provided by the globular portion 30.

Mounted within the housing member 22 is a main valve assembly, generally indicated at 48. While the main valve assembly may assume any desired configuration, as shown, the valve assembly 48 includes a valve disc 50 having a valve stem 52 extending axially downwardly therefrom. The valve stem 52 is slidably mounted within a flow directing member 54 which is mounted in the inlet within the upper end of the tubular portion 24 of the housing member 22. As shown, the flow directing member 54 is formed with a core portion 56 which is centrally apertured, as indicated at 58, for slidably receiving the valve stem 52 therethrough. The flow directing member also includes a plurality of annularly spaced mounting fins 60 extending radially outwardly from the core portion 56 and seating in an appropriate annular recess formed in the upper end of the tubular portion 24.

Mounted in surrounding relation with the valve stem 52 is a coil spring 62. As shown, the lower end of the coil spring 62 is seated upon an abutment formed by a counterbore 64 formed in the core portion 56. The upper end of the coil spring 62 is operatively engaged with the valve disk 50 through a second flow directing member 66. As shown, the flow directing member 66 includes an inner washer portion 68 which is interposed between the valve disk 50 and spring 62, a cylindrical intermediate portion 70 extending down from the inner washer portion 68 and an apertured exterior portion 72 extending upwardly and outwardly from the lower end of the intermediate portion 70. The exterior surface of the exterior portion 72, like the exterior surface of the core portion 56, is shaped with a smooth curvature so as to provide for a smooth direction of flow through the inlet along the exterior periphery thereof and through the globular portion 30 along the exterior periphery thereof when the valve mechanism 48 is disposed in an open position.

As shown, the valve assembly 48 includes a resilient valve washer 74 which is mounted in a recess in the upper surface of the valve disk 50. As shown, the resilient valve washer 74 includes an outer annular surface 76 which is constructed to sealingly engage the annular valve seat 46. The valve washer 74 is fixedly attached to the valve disk 50 by a third flow directing member 78 which forms an upper part of the main valve assembly 48. The flow directing member 78 includes a core portion 80 which, like the core portion 56, is provided with an exterior periphery which is smoothly curved to direct the flow from the upper exterior periphery of the globular portion 30 outwardly through the main outlet when the valve mechanism is disposed in its open position.

The lower end of the core portion 80 is generally disk shaped in configuration and engages the upper surface of the resilient valve washer 74. A bolt 82 extending through the core portion 80 and disk valve 50 and engaged within the valve stem 52 serves to retain the resilient valve washer 74 between the core portion 80 and the disk valve 50. A central cylindrical spacer portion may be extended downwardly from the core portion 80 to limit the squeezing action of the bolt 82 on the resilient valve washer 74.

The third flow directing member 78 like the first member 54, includes a plurality of annularly spaced guide fins 84 extending radially outwardly from the core portion 80. The guide fins 84 are provided with exterior peripheral surfaces which guidingly slide within the interior periphery of the tubular member 38. In this way, both the upper and lower ends of the main valve assembly 48 are guided for reciprocating movement between opened and closed positions, as shown in FIGS. 2 and 3, respectively.

Figure 5:
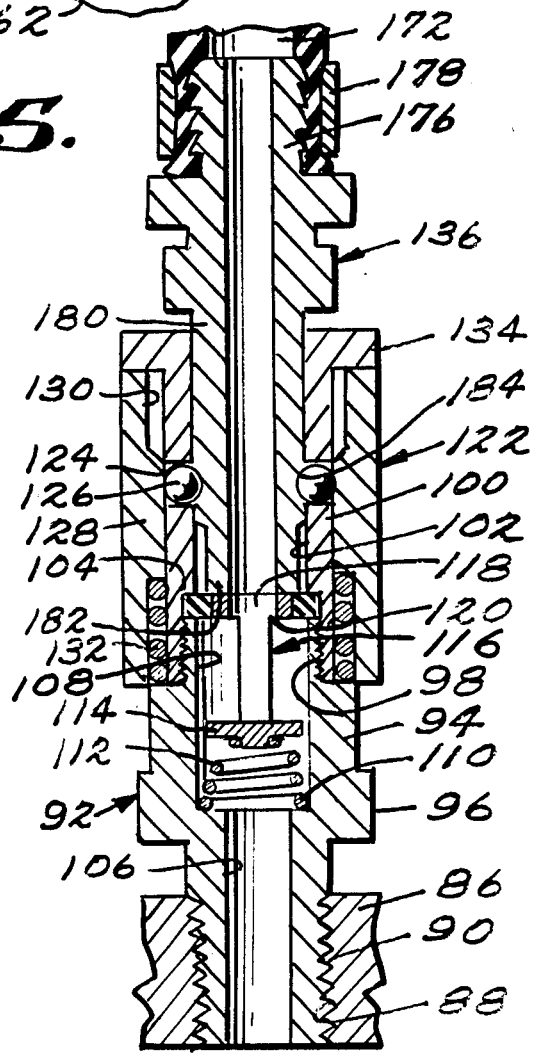
FIG. 5 is an enlarged fragmentary sectional view taken along the line 5—5 of FIG. 2.

The globular portion 30 of the housing member 22 includes an enlarged boss portion 86 which is formed with a bore 88 extending therethrough and into communication with the interior of the globular portion 30. The axis of the bore 88 may typically form an angle of approximately 18° with respect to the vertical. The outer end of the bore 88 is formed with an interior tapered thread for sealingly meshing with an exterior tapered thread 90 formed on one end of a tubular fitting, generally indicated at 92. As best shown in FIG. 5, the tubular fitting 92 includes an inner tubular member 94 which provides the exteriorly threaded end for engaging the threaded end of the bore 88. On the central exterior of the member 94 are formed hexagonal flats 96 by which the member is turned into the threaded boss so as to secure a fluid type connection by the intermeshing of the tapered threads. The outer end of the member 94 has its exterior periphery formed of reduced diameter and threaded, as indicated at 98, to meshingly engage the interior threads on the interior of a second tubular member 100 forming a part of the fitting 92. The member 100 is formed with a cylindrical interior periphery 102 defining a pilot pressure outlet which leads to a resilient washer 104 fixed between the adjacent end surfaces of the tubular members 94 and 100 at a position outwardly of the threaded engagement 98 therebetween. The resilient washer 104 defines a valve seat within the central portion of the tubular fitting 92.

Figure 7:
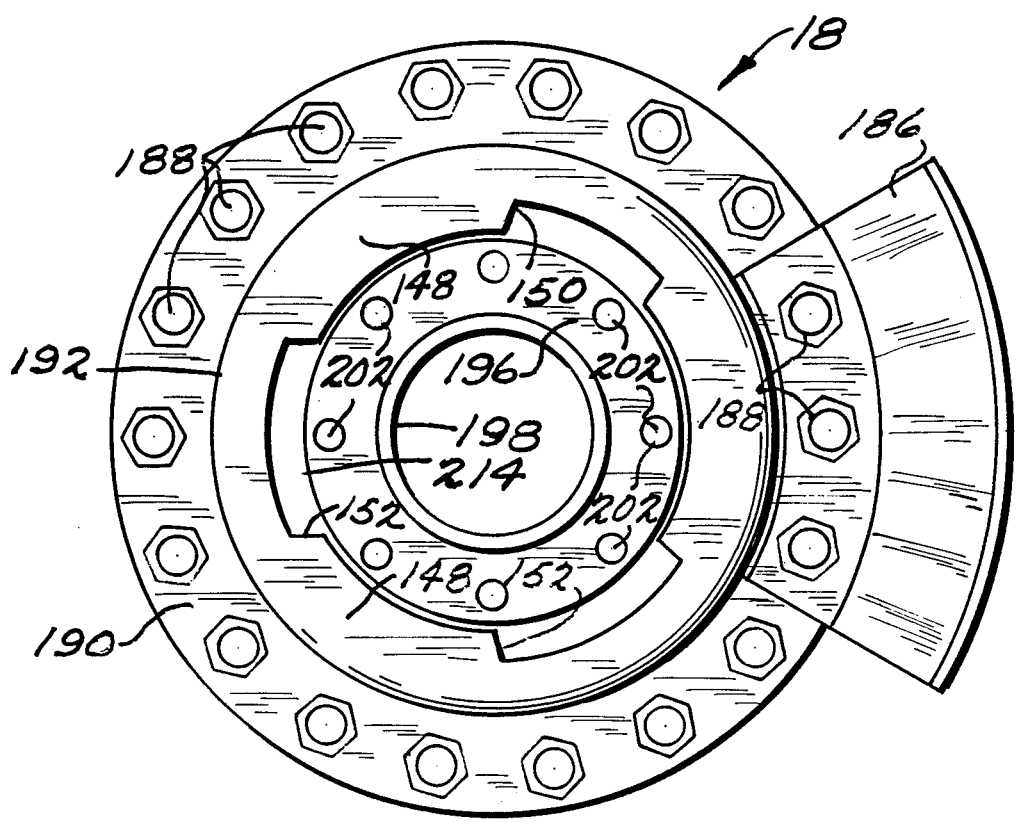
FIG. 7 is a bottom view of the accessing assembly looking in the direction of the arrows 7—7 of FIG. 3.

The inner tubular member 94 is formed with a throughbore 106 having a counterbore 108 in the outer end thereof which defines an outwardly facing annular shoulder 110. Seated on the shoulder 110 is the large end of a spiral coil spring 112, the small end of which engages a valve disk 114. The valve disk 114 forms a part of a pilot pressure valve assembly, generally indicated at 116, which serves to control or contain the water under pressure within the bore 88 of the access structure 20. The valve assembly 116 includes a cylindrical portion 118 extending outwardly from the valve disk 114. The cylindrical portion is formed with relatively large openings 120 therein and has an exterior dimension generally equal to the interior dimension of the washer 104 and less than the exterior dimension of the valve disk 114. It can be seen that the spring 112 serves to resiliently bias the valve disk 114 into a position of engagement with the valve seat provided by the resilient washer 104. The cylindrical portion 118 constitutes in effect a hollow valve stem which serves to guide the movement of the valve disk 114 between its opened position, as shown in FIG. 7, and its closed position.

The fitting 92 is provided in its outer end portion with a detachable interengaging coupling assembly, generally indicated at 122. The coupling assembly 122 includes a series of annularly spaced openings 124 extending radially through the outer end portion of the tubular member 100. Mounted within each of the openings 124 is a ball 126 having a diameter which is greater than the radial dimension of the associated opening 124. Preferably, each opening 124 is formed so that the associated ball 126 can have its inner periphery moved radially inwardly beyond the interior periphery provided by the bore 102. The configuration of each opening 124 is such, however, that the associated ball 126 cannot pass radially inwardly into the bore 102.

Slidably mounted on the exterior periphery of the member 100 is a sleeve 128. The central portion of the sleeve 128 has its inner periphery sized to slidably engage the exterior periphery of the central portion of the tubular member 100. At the outer end of the sleeve the interior peripheral surface is relieved, as indicated at 130, so that when this portion is disposed adjacent the openings 124 the associated balls 126 can move radially outwardly of the openings so that their inner peripheries are disposed within the openings. The inner end of the sleeve 128 is likewise relieved along its inner periphery to receive therein a coil spring 132 which serves to resiliently bias the sleeve 128 outwardly into abutting engagement with an annular flange 134 formed on the outer end of the tubular member 100.

The coupling assemlby 122 is adapted for detachable interengagement with a cooperating coupling means 136 carried by the accessing assembly 18. However, the interengagement is to be effected only after a main mechanical connection between the access and accessing assemblies has been established by interengaging main detachable coupling means, generally indicated at 138 and 140, carried by the access assembly 16 and accessing assembly 18, respectively.

Figure 6:
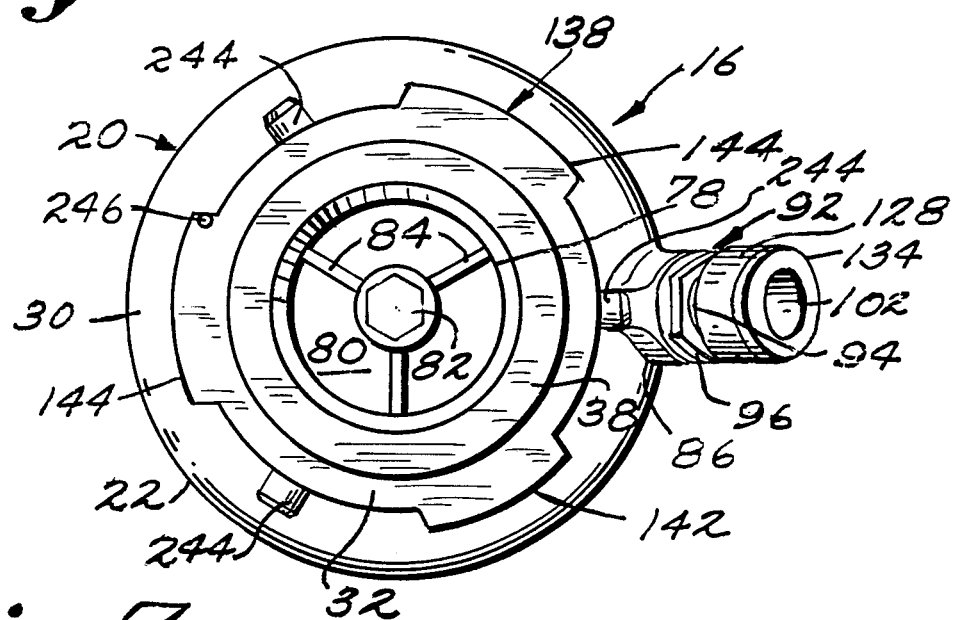
FIG. 6 is a top plan view of the access assembly looking in the direction of the arrows 6—6 of FIG. 3.

As best shown in FIG. 6, the coupling means 138 of the access assembly 16 is preferably in the form of a plurality of annularly spaced lugs including a small lug 142 and two larger lugs 144 extending radially outwardly from the annular portion 32 of the housing structure 20. As best shown in FIGS. 2 and 3, the lugs 142 and 144 include downwardly facing locking surfaces 146 which are adapted to interengage with the upwardly facing surface of an inwardly extending annular flange 148 having annularly spaced lug receiving notches formed therein including a small notch 150 corresponding in size to the lug 142 and two notches 152 corresponding in size to the lug 144. The notched flange 148 constitutes the coupling means 140 of the accessing assembly 18 and effectively provides a plurality of annualrly spaced lugs which interengage with the lugs 142 and 144 to effect mechanical connection between the access structure 20 and an accessing structure, generally indicated at 154, of which the notched flange 148 is a part.

The accessing assembly 18 includes a pressure actuated operating mechanism, generally indicated at 156, which is mounted within the accessing structure 154. The operating mechnism 156 is connected with a pressure communicating assembly, generally indicated at 158, providing with the fitting 92 and the coupling assemblies 122 and 136 a pilot pressure flow path for communicating a source of water under pressure from the access assembly 16 through the pilot pressure outlet 102 to the accessing assembly 18 and specifically to the operating mechanism 156 thereof to actuate the same. Such actuation is not undertaken until after the main detachable coupling means 138 and 140 are interengaged with one another to effect the aforesaid mechanical connection between the access structure 20 of the access assembling 16 and the accessing structure 154 of the accessing assembly 18. Once this mechanical connection is established, actuation of the operating mechanism 156 serves to effect a water pressure rigidified securement of the mechanical connection which has been established and to move the main access valve mechanism 48 of the access assembly 16 from its closed position into its open position.

The accessing structure 154 includes an upper member 160 which, and shown, is preferably a metal casting. The member 160 is generally of hollow annular configuration having three annularly spaced radially outwardly extending lugs 162 formed at the upper end thereof which are apertured to receive bolts 164. Bolts 164 serve to secure the sprinkler head mechanism 12 to the upper end of the member 160 which constitutes a sprinkler head outlet for the accessing structure 154.

The lower portion of the member 160 flares outwardly and terminates in an annular mounting flange 166. The lower outwardly flared portion of the member 160 is formed with an opening 168 which is provided with interior tapered threads for cooperatively sealingly engaging exterior tapered threads on one end of a hose fitting 170. The opposite end of the hose fitting 170 is connected to one end of a hose 172, as by a band coupler 174. The hose 172 constitues an essential component of the water pressure communicating assembly 158 and its opposite end is connected with a tubular fitting 176 as by a band coupler 178.

The tubular fitting 176 includes as an integral part thereof the detachable interengaging coupling means 136 which is adapted to cooperate with the coupling means 122 provided on the access assembly 16. It will be noted that the fitting 176 includes a tubular portion 180 extending away from the band coupler 178. The extremity of the tubular portion 180 is of reduced diameter, as indicated at 182. Spaced from the extremity 182 is an annular groove 184. As shown, the axial extent of the tubular portion 180 and the relative location of the annular groove 184 with respect to the axial extent of the reduced end portion 182 is such that when the tubular portion 180 is engaged within the opening 102 provided in the tubular element or member 100 of the coupling assembly 122 with the sleeve 112 moved in a direction against the spring 132, the normally closed valve 114 will be moved by the end 182 of the tubular portion into an open position away from the valve seat 104, as shown in FIG. 5, and the annular groove 184 will be in a position to receive the balls 126. When the sleeve 128 is released allowing the spring 132 to return it to its normal spring biased position as shown in FIG. 5, the inner portion of the balls 126 are captured within the groove and the interengagement detachably retains the tubular portion 180 in coupled relation. Moreover, it will be noted that the components of the tubular portion 180 are such that the end 182 also engages the resilient washer 104 so as to provide for a watertight communication between the coupling assembly 122 and the cooperating coupling means 136 so as to insure against leakage of the water pressure from the chamber 30 of the access assembly 16 to the hose 172 of the accessing assembly.

In accordance with the principles of the present invention, means is provided for insuring that the main detachable interengaging coupling means 138 and 140 of the assemblies 16 and 18 are properly interengaged before the coupling means 136 is interengaged with the coupling assembly 122. As best shown in FIGS. 1–3 and 7, such a means is preferably in the form of a segmental guard or shield plate 186 which is mounted below the lower annular mounting flange 166 of the member 160 as by a plurality of bolts 188. As best shown in FIG. 7, the shield 186 has an arcuate segmental extent of approximately 60° and the bolts 188 which extend therethrough and through the mounting flange 166 constitute but three of a series of eighteen annularly spaced bolts 188 which extend through the mounting flange 166 and through a similar mounting flange 190 formed on the end of a second housing member 192. The housing member 192 is preferably of bent tubular metal so that the main axial extent thereof provides a cylindrical wall which extends downwardly from the inner end of the upper mounting flange 190. The notched flange 148 extends radially inwardly from the central cylindrical wall provided by the member 192. The bolts 188 serve to rigidly interconnect the member 160 and both members constitute the accessing structure 154 of the accessing assembly 18.

The operating mechanism 156 of the accessing assembly 18 includes a folded rolling seal 194, one end of which is sealingly retained between the lower mounting flange 166 of the member 160 and the upper mounting flange 190 of the member 192 by virtue of the extension of the bolts 188 therethrough.

The opposite end of the folded rolling seal 194 is connected with a mounting flange 196 formed on the central exterior periphery of a tubular member 198. The tubular member 198 constitutes value actuating member and is mounted within the structure 154 of the accessing assembly 18 for vertical reciprocating movement between an inoperative position, as shown in FIG. 3 and an operative position, as shown in FIG. 2. The tubular actuating member 198 is sealed exteriorly above the flange 196 by an annular seal assembly 200 suitably mounted in the interior periphery of the upper housing member 160. The opening 168 is between the seal assembly 200 and the seal provided by the water tight securement of the outer end portion of the folded rolling seal 194 between the flanges 166 and 190 by bolts 188. The inner end portion of the folded rolling seal 194 is secured in water tight relation with the flange 196 by a multiplicity of annularly spaced bolts 202 which extend downwardly through an upper exteriorly skirted washer 204, the inner end portion of the folded rolling seal 194 and an upper inwardly extending flange 206 of a cylindrical tubular member 208. The bolts 202 are threadedly engaged within suitable threaded apertures in the actuating member flange 196. It can be seen that the folded rolling seal 194 and annular seal assembly 200 define a water pressure actuating expansible and contractible chamber 210 bounded exteriorly by the interior of the portion of the housing member 160 between the seal assembly 200 and the lower flange 166 and the exterior of the portion of the actuating member 198 between flange 196 and the seal assembly 200.

The valve actuating member 198 is resiliently biased into its raised inoperative position by a coil spring 212, the upper end of which is seated beneath the flange 206 of the tubular member 208 outwardly of the flange 194 of the actuating member 198. The lower end of the coil spring 212 is seated on an interiorly skirted washer 214 which, in turn, is seated on the upwardly facing surface of the notched flange 148 of the lower housing member 192. The washer 214 extends inwardly a distance sufficient to overlie the notches 152 in the flange 148 so as to present a downwardly facing surface operable to engage the upwardly facing surfaces of the lugs 144 of the access assembly 16 when the accessing assembly 18 is initially engaged therewith. The tubular cylindrical member 208 is formed with a lower outwardly extending flange 216 which is positioned to seat on the outer marginal portion of the upper surface of the washer 214.

Figure 8:
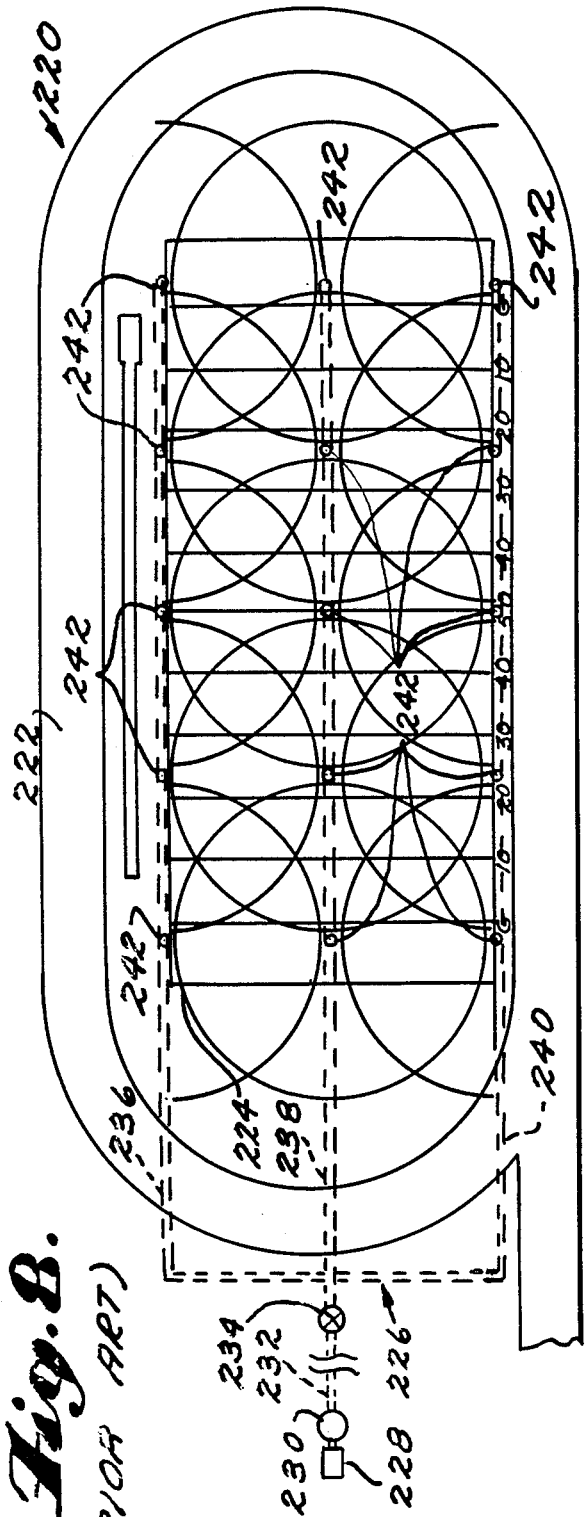
FIG. 8 is a schematic layout or top plan view showing a conventional sprinkler irrigation system applied to an athletic field including an oval track defining a football playing area therein; and, FIG. 9 is a view similar to FIG. 8 showing a system embodying the principles of the present invention applied thereto.

Referring now more particularly to FIG. 8 in the drawings, there is shown therein an athletic field, generally indicated at 220 of the type which includes an oval track 222 defining therein a football playing area 224. FIG. 8 illustrates a typical prior art underground installation for operation with existing medium capacity sprinkler head assemblies fitted with couplers of the prior art type for cooperative engagement with the valve assemblies of the underground system. In FIG. 8, the underground system is indicated generally by the reference numeral 226. As shown, the system includes a suitable source of water under pressure which may be a city main or, as shown, includes a motor 228 driving a pump 230 which draws water from a well or pond and delivers it under pressure to an outlet pipe 232. Flow in the outlet pipe 232 is controlled by a main valve 234. From the main control valve 234 water is distributed by suitable branch piping to three main lines 236, 238 and 240. As shown, these lines are mounted underground parallel with the football field with the middle line 238 running beneath the middle of the playing field while the two lateral outside lines are along the sidelines. Extending upwardly from each line are five spaced riser pipes which are capped off by conventional valve assemblies 242. Examples of the valve assemblies 242 which may be utilized are the "SureQuick" turf valves such as manufactured by Rainbird, the "400" or "800" series of quick coupling valves manufactured by Skinner and the quick coupling system manufactured by Royal Coach Sprinklers.

The arrangement is such that each valve assembly 242 is accessed by a coupler (not shown) which in turn carries a sprinkler head (not shown). In the system shown, the sprinkler head should be of the part-circle type capable of being adjusted to full circle mode of operation. FIG. 8 illustrates the sprinkler pattern of the sprinkler head when coupled with each one of the 15 valve assemblies 242 of the system. The arrangement, as shown, would include the operation of sprinkler heads in full circle mode in conjunction with the valve assemblies 242 of the central line 238. The sprinkler head would be adjusted for half-circle operation when accessed with the valve assemblies 242 of the outside lines 236 and 240. It will be noted that the overlapping sprinkler patterns provide for full coverage of the football playing area but that there are provided five valve assemblies 242 which are exposed on the playing surface of the football field, a condition which can cause player injury. It will also be understood that the system as shown in FIG. 8 may be utilized with a single sprinkler head and attached coupler or that more than one such combined assemblies can be utilized. The usual situation is that there are a substantially lesser number of coupler-sprinkler head assemblies (e.g. one, two or three) utilized than valve assemblies (e.g. fifteen). The system itself is not an automatic system and is provided primarily to cut initial equipment costs. For example, an automatic system comparable to the system disclosed would require fifteen coupler-sprinkler head assemblies (rather than one, two or three) to be controlled by the additionally provided automatic control equipment. Heretofore a low cost arrangement such as depicted in FIG. 8 could not be provided in a football playing area without the disadvantage of mounting valve assemblies in the playing area.

Figure 9:
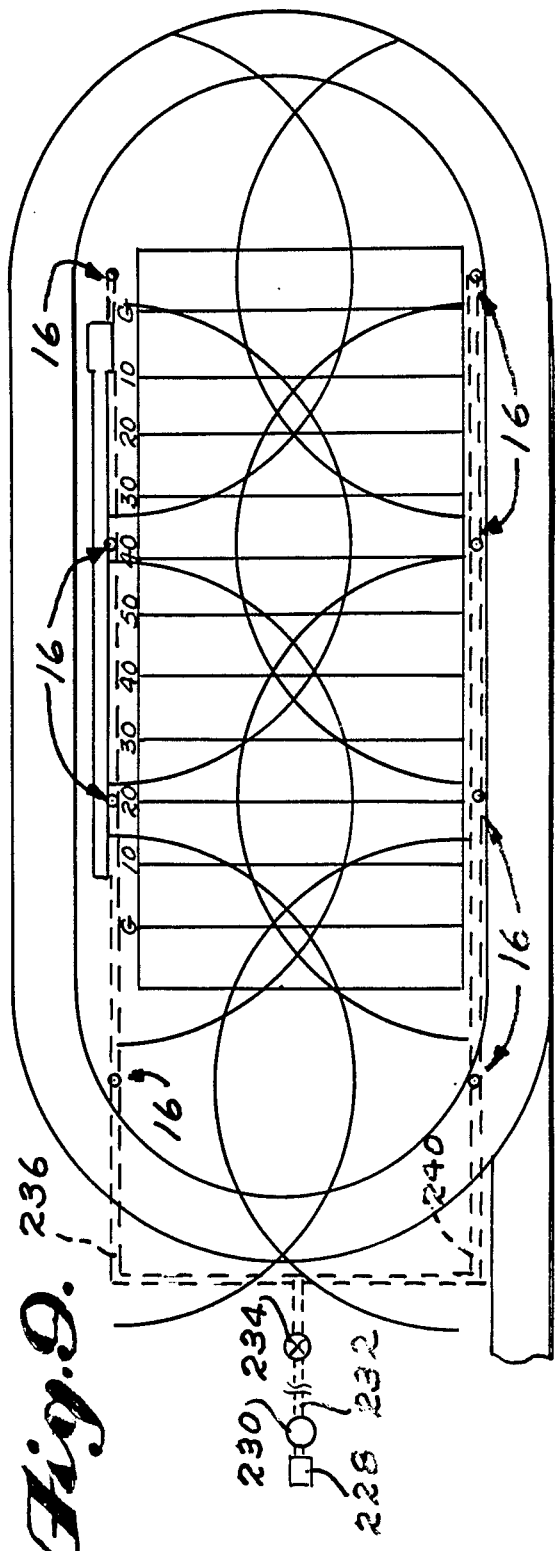

FIG. 9 illustrates a similar installation utilizing the access assemblies 16 of the present invention in conjunction with an accessing assemby 18 with attached sprinkler head assembly 12. It will be noted that the underground piping system can be simplified in that the central line 238 can be eliminated and the two outside lines 236 and 240 can be spaced apart a distance slightly greater than in the prior art arrangement of FIG. 8. In the arrangement shown, there are riser pipes provided for eight access assemblies 16, four on the line 236 and four on the line 240.

With reference to FIG. 3 of the drawings which shows an access assembly 16 in its inoperative position and an accessing assembly 18 separated therefrom in vertically spaced relation, it will be noted that the main valve assembly 48 is in its closed position preventing water within the chamber 30 from passing outwardly through the outlet provided by the tubular member 38. similarly, the pilot valve 114 within the fitting 92 is engaged with the seat 104 preventing water under pressure within the chamber 30 from passing outwardly through the end of the pilot fitting. When it is desired to obtain access to any one of the access assemblies 16 the accessing assembly 18 with the sprinkler head 12 attached thereto is positioned in axial alignment over the access assembly 16 as shown in FIG. 3 with the small notch 150 located in a position above the small lug 142. It will be noted that when the accessing assembly 18 is so oriented with respect to the access assembly 16, guard plate 186 is disposed directly above the opening 102 of the fitting 94. Of course, it would not be appropriate to interengage the coupling member 136 with the coupling assembly 122 before the main coupling means 138 and 140 of the two assemblies are interengaged because the actuation of the operating mechanism 156 of the assembly 18 would occur without performing any useful function. Nevertheless, the position of the guard plate 186 serves as a reminder to the operator that the main coupling means 138 and 140 should be interengaged before the pilot coupling means 122 and 136 because the guard plate prevents the main coupling means 138 and 140 from being interengaged when the pilot coupling means are interengaged.

The interengagement of main coupling means 138 and 140 is commenced by simply moving the access assembly 18 rectilinearly downwardly from the position shown in FIG. 3. As this movement takes place the lower end of the tubular actuating member 198 of the accessing assembly enters into the interior of the annular member 38. This interengagement provides an initial guiding function to the subsequent downward movement of the accessing structure 154. The next engagement which takes place is that the lower surface of the washer 214 extending over the notches 150 and 152 is engaged by the upper surfaces of the three lugs 142 and 144. Further downward movement enables the notched flange 148 to be disposed at a vertical level below the lower surfaces 146 of the lugs 142 and 144. As best shown in FIGS. 2 and 6, the exterior of the main housing member 22 is formed with three annularly spaced integral stop portions 244 which are engaged by the downwardly facing surfaces 146 of the lugs 142 and 144 in order to establish when the aforesaid vertical level has been reached. During this latter movement, spring 212 is compressed by virtue of the relative downward movement of the member 208 with respect to the washer 214 which remains relatively stationary. Once this downward axial movement has been accomplished, the interengagement is completed by turning or rotating the accessing structure 154 about its axis in a clockwise direction as viewed in FIG. 6 so as to interengage the lug surfaces 146 with the upper surface of the notched flange 148. It will be noted that the washer 214 because of its continuous annular surface is maintained in surface contact with the upper surfaces of the lugs 142 and 144. The lugs provided by the notched flange 148 are fully interengaged with the lugs 142 and 144 after a turning movement through approximately 55°. As best shown in FIG. 6, a stop pin 246 in one of the lugs 144 serves to limit the extent of the turning movement by engagement with the adjacent surface of the notched flange 148. A 55° turn is sufficient to angularly displace the guard plate 186 so that it no longer overlies the coupling assembly 122 of the access assembly 16.

After this turning movement has been completed, the main coupling means 138 and 140 of the two assemblies 16 and 18 have achieved a mechanical connection between the structures 20 and 154 of the two assemblies. This mechanical connection has been achieved however with a simple manual movement and its rigidity is determined by the strength of spring 212 which is not chosen to be relatively stiff. An important feature of the present invention is that the mechanical connection can be established by a relatively effortless manual movement so as to achieve a mechanical connection which requires additional rigidification to be effective to withstand the forces transmitted thereto by the high capacity sprinkler head assembly 12 during operation. The additional rigidification of the connection is accomplished by the actuation of the operating mechanism 156. This actuation is accomplished simply by interengaging the pilot coupling means 136 at the end of the hose 172 of the accessing assembly 18 with the coupling assembly 122 of the access assembly. These two units are of generally known construction and as previously indicated when interengaged they serve not only to effect a mechanical securement but to provide for a watertight valve opening water pressure communicating function as well. It will be understood that other functionally similar units may be utilized, if desired.

As soon as coupling means 136 is interengaged with the coupling assembly 122, water pressure within the chamber 30 is communicated to the interior of the hose 172 and within the expansible chamber 210 of the accessing assembly 18. The increased water pressure acting on the movable operating mechanism 156 causes the actuating member 198 and the cylindrical member 208 fixed thereto to move downwardly with respect to the fixed housing structures 30 and 154. As the actuating member 198 moves downwardly the lower end thereof engages the upper surface 78 of the fins 84 of the main valve mechanism 48 thus moving the valve member 76 downwardly away from the valve seat 46. This allows water under pressure within the chamber 30 to flow through the outlet opening defined by the valve seat 46 past the flow directing core portion 80 and fins 84 of the third flow directing member and into the interior of the actuating member 198. The exterior of the actuating member is sealed at opposite ends by the seal 44 and the seal assembly 200. In this way the interior of the actuating member 198 serves to communicate the water under pressure from the chamber 30 to the sprinkler head outlet provided by the housing member 160 which in turn is communicated with the inlet of the sprinkler head 112.

FIG. 2 illustrates the fully opened position of the main valve member 48 when the actuating member 198 reaches the bottom extent of its vertical movement. It will be noted that the three flow directing members 54, 66 and 80 serve to reduce the turbulence in the water flow as it passes out of the discharge end of the riser piper 14 and into the smooth interior of the actuating member 198.

The lowermost position of the actuating member 198 is determined by the engagement of the flange 196 of the tubular member 198 engaging the upper surface of the cylindrical member 38, as shown in FIG. 2. This interengagement provides for the rigidification of the mechanical connection between the two rigid structures 20 and 154 previously described.

After an allowed time of operation the accessing assembly 18 with the attached sprinkler head assembly 12 is detached from the access assembly 16 to which it has been interengaged and moved into interengagement with another one of the access assemblies 16 of the system. Disengagement is accomplished essentially by reversing the procedures previously described. In this regard it will be noted that the guard plate 186 is disposed in a position such that it would not be possible for an operator to effect a counter clockwise turning movement, notwithstanding the rigidification of the mechanical connection provided by the water pressure. That is, the edge of the guard plate 186 would engage the hose 172 to prevent such turning movement. Again, the guard plate 186 reminds the operator that he should detach the coupling means 126 from the coupling assembly 122 before undertaking any such turning movement. This detachment is accomplished as aforesaid by simply moving the sleeve 128 downwardly and pulling out the fitting 178 and then releasing the sleeve 128. As the fitting 178 moves outwardly the pilot valve closes to prevent escape of water under pressure from chamber 30. As soon as the fitting 176 is disengaged, water within the expansible chamber 210 can pass outwardly therefrom through the hose and out the open end 182 of the fitting 176. Spring 212 assists in this outward movement of the water from the chamber 210 as well as the spring 62 which is biasing the main valve 76 to its closed position.

In this way, the operating mechanism 156 returns to its inoperative position which has the effect of relieving the water pressure rigidification of the mechanical connection between the structures 20 and 154. Thus, disengagement can be accomplished with a relatively effortless manual turning movement and a subsequent lifting movement.

It thus will be seen that the objects of this invention have been fully and effectively accomplished. It will be realized, however, that the foregoing preferred specific embodiment has been shown and described for the purpose of illustrating the functional and structural principles of this invention and is subject to change without depart from such principles. Therefore, this invention includes all modifications encompassed within the spirit and scope of the following claims.

What is claimed is:

1. Apparatus for enabling a sprinkler head assembly to be detachably mounted on an irrigation system riser pipe containing water under pressure in accessed relation to the water under pressure within the riser pipe, said apparatus comprising:

an access assembly including an access structure providing (1) chamber means for containing water under pressure, (2) inlet means for communicating with said chamber means, (3) main access outlet means for communicating with said chamber means, and (4) pilot pressure outlet means for communicating with said chamber means, means on said access structure for enabling the same to be fixedly mounted on the riser pipe in a relationship such that said inlet means is in communication with water under pressure within the riser pipe, Main valve means mounted with respect to said main outlet means for movement between (1) a closed access position preventing water under pressure within said chamber means from flowing through said main outlet means and (2) an opened accessed position enabling water under pressure within said chamber means to flow through said main outlet means, pilot pressure valve means mounted with respect to said pilot pressure outlet means for movement between (1) a closed inoperative position preventing water under pressure within said chamber means from flowing through said pilot pressure outlet means and (2) an opened operative position enabling water under pressure within said chamber means to flow through said pilot pressure outlet means, an accessing assembly including an accessing structure providing sprinkler head outlet means, means on said accessing structure for enabling a sprinkler head assembly to be secured on said accessing structure in a relationship such that said sprinkler head outlet means is communicated with the sprinkler head assembly, main detachable interengaging means operatively associated between said access and accessing structures for enabling said accessing structure to be conveniently manually secured on said access structure in a relationship such that access to water under pressure within said chamber means can be obtained by movement of said main valve means into its opened position, operating means mounted on said accessing structure for movement from an inoperative position into an operative position in response to the communication of water under pressure therewith to thereby effect movement of said main valve means into its open position and establish communication of water under pressure from said chamber means with said sprinkler head outlet means through said main outlet means, means for communicating a source of water under pressure with said operating means so as to effect movement thereof from said inoperative position into said operative position, and second detachable interengaging means for conveniently manually effecting a securement of said water pressure communicating means in communicating relation with said pilot pressure outlet means so that access to water under pressure within said chamber means can be obtained for communication with said water pressure communicating means when said pilot pressure valve means is in its opened position.

2. Apparatus as defined in claim 1 wherein said operating means is operable when in said operative position to also effect a water pressure rigidified securement between said access and accessing structures in addition to the securement provided by said main detachable interengaging means.

3. Apparatus as defined in claim 2 wherein said operating means includes a hollow valve actuating member having an open upper end portion slidably sealingly mounted in said sprinkler head outlet means for reciprocating movement between inoperative and operative position, said valve actuating member having a lower end portion adapted to engage and move said main outlet valve means from its closed position into its opened position when said tubular member is moved from its inoperative position into its operative position, the lower end portion of said valve actuating member being configured to communicate water under pressure from said chamber means flowing through said main outlet means with the interior of said valve actuating member.

4. Apparatus as defined in claim 3 wherein said main detachable interengaging means includes a first plurality of annularly spaced lugs on said access structure having first locking surface means facing in a downward direction away from said accessing structure, a second plurality of annularly spaced lugs on said accessing structure having second locking surface means facing in an upward direction so as to engage said first locking surface means when said second plurality of lugs are disposed in interengaged relation with respect to said first plurality of lugs by sequential longitudinal and rotational movements of said accessing structure with respect to said access structure.

5. Apparatus as defined in claim 4 wherein said first plurality of lugs are formed with third locking surface means facing in an upward direction, said operating means including a rigid annular member fixed to the exterior of said valve actuating member in a position to apply opposing pressure on said third locking surface means when said valve actuating member is disposed in said operative position.

6. Apparatus as defined in claim 5 wherein the central exterior of said valve actuating member is provided with an annular flange, said annular member including (1) an upper portion fixed to said annular flange, (2) a lower outer portion for applying the opposing pressure on said third locking surface means and (3) a cylindrical portion extending between said upper portion and said lower outer portion.

7. Apparatus as defined in claim 6 wherein said operating means includes coil spring means inwardly of said cylindrical portion operatively engaged with said upper portion for biasing said annular member and said valve actuating member upwardly toward said inoperative position.

8. Apparatus as defined in claim 7 wherein said operating means further includes an interiorly skirted washer engaging said coil spring means, said skirted washer including (1) a skirted inner annular portion disposed in a position to engage said third locking surface means and (2) an outer annular portion disposed in a position to engage the lower outer portion of said annular member when said first and second pluralities of lugs are in interengaged relation.

9. Apparatus as defined in claim 6 wherein said accessing structure includes (1) an upper housing member having an upper tubular portion providing said sprinkler head outlet means and a lower exterior flange portion and (2) a lower housing member having an upper exterior flange portion fixed to said lower flange portion and a cylindrical wall portion extending downwardly from said upper flange portion.

10. Apparatus as defined in claim 9 wherein said operating means includes a folded rolling seal having (1) an outer end portion sealingly fixed between said upper and lower flange portions and rollingly engaging the interior of the cylindrical wall portion of said lower housing member and (2) an inner end portion sealingly fixed to the annular flange of said valve actuating member and rollingly engaging the exterior of the cylindrical portion of said annular member.

11. Apparatus as defined in claim 2 wherein said main detachable interengaging means includes opposed locking surface means movable (1) into interengaging relation after a turning movement of said accessing structure with respect to said access structure in one direction and (2) out of interengaging relation after a turning movement of said accessing structure with respect to said access structure in an opposite direction, and interlock means for preventing the interengagement of said second detachable interengaging means until after said accessing structure has been turned in said one direction to move said opposed locking surface means into interengaging relation and for preventing a turning movement of said accessing structure in said one direction to move said opposed locking surface means out of interengaging relation until after the detachment of said second detachable interengaging means.

12. Apparatus as defined in claim 11 wherein said interlock means comprises a segmental guard plate fixed to said access structure in a position to permit movement (1) and (2) only when said second detachable interengaging means is detached.

13. Apparatus as defined in claim 2 wherein said access structure includes a first tubular fitting communicating at one end with said chamber means and being open at its opposite end, means defining an annular pilot valve seat within said first fitting between the ends thereof, said pilot valve means comprising a pilot valve member mounted in said first fitting for movement toward and away from said pilot valve seat and pilot spring means acting on said pilot valve member to bias the same to move into a direction toward the open end of said female fitting and into closing engagement with said pilot valve seat, said water pressure communicating means including a flexible hose communicating at one end with said operating means and a second tubular fitting on the opposite end of said hose of a size to engage within said first fitting, said second detachable interengaging means being carried by said first and second fittings and being operable when in interengaging relation to secure said second fitting in an operative position of engagement within said first fitting, said second fitting having means operable when in said operative position for maintaining said pilot value member in spaced relation from said pilot valve seat and the interior of said second fitting in water pressure communicating relation with the interior of the end of said first fitting communicating with said chamber means.

14. Apparatus as defined in claim 13 wherein said second detachable interengaging means comprises means defining an annular groove in the exterior periphery of the portion of said second fitting engaged within said first fitting when said second fitting is in said operative position, means defining a series of annularly spaced openings extending radially through said first fitting at a position outwardly of said pilot valve seat, a ball in each said openings having a diameter greater than the radial dimension of the associated opening, and a sleeve mounted over the exterior periphery of said first fitting for movement between an interengaging position and a detaching position, said sleeve having a first interior peripheral portion disposed to extend over said openings when said sleeve is in said interengaging position so as to insure that the balls are prevented from radially outward movement from locking positions within said openings wherein their inner peripheries engage within said annular groove when said second fitting is in said operative position and a second interior peripheral portion disposed to extend over said openings when said sleeve is in said detaching position so as to permit the balls to move within their openings radially outwardly of their locking positions sufficient to be disposed out of said annular groove when said second fitting is detached from its operative position.

15. Apparatus as defined in claim 2 wherein said access structure includes a main housing member comprising axially spaced and axially aligned first and second tubular portions having a globular portion therebetween, the interior of said first tubular portion providing said inlet means, the interior of said globular portion providing said chamber means, said main outlet means being provided by a tubular member fixed within said second tubular portion and extending outwardly thereform, means on the inner end portion of said tubular member defining an annular main valve seat, said main valve means comprising a main valve assembly mounted within said housing member for movement toward and away from said main valve seat and main spring means acting on said main valve assembly to bias the same in a direction toward the outwardly extending portion of said tubular member and into closing engagement with said main valve seat.

16. Apparatus as defined in claim 15 wherein said main valve assembly includes a valve disk having a valve stem extending axially therefrom in a direction toward the first tubular portion of said main housing member, a first flow directing member fixed within said first tubular portion, said first flow directing member slidably guidingly receiving said valve stem, said main spring means comprising a coil spring surrounding said valve stem having one end operatively engaged with said first flow directing member.

17. Apparatus as defined in claim 16 wherein said main valve assembly includes a resilient valve washer having an annular portion shaped to engage said main valve seat, and a second flow directing member fixed to said valve disk in a relationship such that said resilient valve washer is fixed therebetween.

18. Apparatus as defined in claim 17 wherein said second flow directing member includes a core portion providing a curved smooth flow directing exterior periphery and a plurality of annularly spaced guide fin portions extending radially outwardly from the exterior periphery of said core portion and having radially outwardly facing guide surfaces slidably engaging the interior periphery of said tubular member.

19. Apparatus as defined in claim 18 wherein said main valve assembly further includes a third flow directing member mounted in surrounding relation to said valve stem in abutting engagement with said valve disk, said third flow directing member including an inner portion engaged between said valve disk and the adjacent end of said coil spring, an intermediate portion surrounding the adjacent end portion of said coil spring and an outer portion presenting a curved smooth flow directing exterior periphery.

20. Apparatus as defined in claim 15 wherein the interior periphery of said second tubular portion is formed with interior threads meshingly engaging exterior threads on a portion of the exterior periphery of said tubular member and an annular seal between said tubular member and said second tubular portion outwardly of said meshingly engaging threads.

21. Apparatus as defined in claim 2 wherein said means for enabling said access structure to be fixedly mounted on the riser pipe comprises interior threads on the interior periphery of said first tubular portion.

22. A water pressure access assembly for connection with an irrigation system riser pipe containing water under pressure, said water pressure access assembly comprising an access structure providing (1) chamber means for containing water under pressure (2) inlet means for communicating with said chamber means (3) main outlet means for communicating with said chamber means and (4) pilot pressure outlet means for communicating with said chamber means, means on said access structure for enabling the same to be fixedly mounted on the riser pipe in a relationship such that said inlet means is in communication with water under pressure within the riser pipe, main valve means mounted with respect to said main outlet means for movement between (1) a closed access position preventing water under pressure within said chamber means from flowing through said main outlet means and (2) an opened accessed position enabling water under pressure within said chamber means to flow through said main outlet means, first detachable means on said access structure for enabling an accessing assembly connected with a sprinkler head assembly to be conveniently manually detachably secured to said access structure in a relationship such that access to water under pressure within said chamber means can be obtained by movement of said main valve means into said opened position, pilot pressure valve means mounted with respect to said pilot pressure outlet means for movement between (1) a closed inoperative position preventing water under pressure within said chamber means from flowing through said pilot pressure outlet means and (2) an opened operative position enabling water under pressure within said chamber means to flow through said pilot pressure outlet means, and second detachable means on said access structure for enabling a pilot pressure communicating means of the accessing assembly to be conveniently manually detachably secured with said access structure in a relationship such that access to the water under pressure within said chamber means can be obtained through said pilot pressure outlet means when said pilot pressure valve means is in said opened position so as to enable the pilot pressure communicating means of the accessing structure to effect movement of said main valve means into said opened accessed position.

23. Apparatus as defined in claim 22 wherein said access structure includes a main housing member comprising axially spaced and axially aligned first and second tubular portions having a globular portion therebetween, the interior of said first tubular portion providing said inlet means, the interior of said globular portion providing said chamber means, said main outlet means being provided by a tubular member fixed within said second tubular portion and extending outwardly therefrom, means on the inner end portion of said tubular member defining an annular main valve seat, said main valve means comprising a main valve assembly mounted within said housing member for movement toward and away from said main valve seat and main spring means acting on said main valve assembly to bias the same in a direction toward the outwardly extending portion of said tubular member and into closing engagement with said main valve seat.

24. Apparatus as defined in claim 23 wherein said main valve assembly includes a valve disk having a valve stem extending axially therefrom in a direction toward the first tubular portion of said main housing member, a first flow directing member fixed within said first tubular portion, said first flow directing member slidably guidingly receiving said valve stem, said main spring means comprising a coil spring surrounding said first flow directing member.

25. Apparatus as defined in claim 24 wherein said main valve assembly includes a resilient valve washer having an annular portion shaped to engage said main valve seat, and a second flow directing member fixed to said valve disk in a relationship such that said resilient valve washer is fixed therebetween.

26. Apparatus as defined in claim 25 wherein said second flow directing member includes a core portion providing a curved smooth flow directing exterior periphery and a plurality of annularly spaced guide fin portions extending radially outwardly from the exterior periphery of said core portion and having radially outwardly facing guide surfaces slidably engaging the interior periphery of said tubular member.

27. Apparatus as defined in claim 26 wherein said main valve assembly further includes a third flow directing member mounted in surrounding relation to said valve stem in abutting engagement with said valve disk, said third flow directing member including an inner portion engaged between said valve disk and the adjacent end of said coil spring, an intermediate portion surrounding the adjacent end portion of said coil spring and an outer portion presenting a curved smooth flow directing exterior periphery.

28. Apparatus as defined in claim 23 wherein the interior periphery of said second tubular portion is formed with interior threads meshingly engaging exterior threads on a portion of the exterior periphery of said tubular member and an annular seal between said tubular member and said second tubular portion outwardly of said meshingly engaging threads.

29. Apparatus as defined in claim 22 wherein said access structure includes a tubular fitting communicating at one end with said chamber means and being open at its opposite end means defining an annular pilot valve seat within said fitting between the ends thereof, said pilot valve means comprising a pilot valve member mounted in said fitting for movement toward and away from said pilot valve seat and pilot spring means acting on said pilot valve member to bias the same to move into a direction toward the open end of said female fitting and into closing engagement with said pilot valve seat, said second detachable means being carried by said fitting.

30. Apparatus as defined in claim 29 wherein said second detachable means further comprises means defining a series of annularly spaced openings extending radially through said fitting at a position outwardly of said pilot valve seat, a ball in each of said openings having a diameter greater than the radial dimension of the associated opening, and a sleeve mounted over the exterior periphery of said fitting for movement between an interengaging position and a detaching position, said sleeve having a first interior peripheral portion disposed to extend over said openings when said sleeve is in said interengaging position so as to insure that the balls are prevented from radially outward movement from locking positions within said openings wherein their inner peripheries extend inwardly of the interior periphery of the fitting and a second interior peripheral portion disposed to extend over said openings when said sleeve is in said detaching position so as to permit the balls to move within their openings radially outwardly of their locking positions sufficient to be disposed outwardly of the interior periphery of the fitting.

31. A water pressure accessing assembly for connection with a sprinkler head assembly for enabling the sprinkler head assembly to be selectively connected with an irrigation system riser pipe containing water under pressure in accessed relation to the water under pressure therein, said water pressure assembly comprising:

an accessing structure providing sprinkler head outlet means, first detachable means on said accessing structure for enabling said accessing assembly to be conveniently manually detachably secured to a riser pipe mounted access assembly having chamber means communicating with a main outlet means controlled by main valve means and a pilot pressure outlet means controlled by pilot pressure valve means in a relationship such that access to water under pressure within the chamber means through the main outlet means of the access assembly can be obtained when the main valve means of the access assembly is opened for communication with said sprinkler head outlet means, means on said accessing structure for engaging a sprinkler head assembly to be secured on said accessing structure in a relationship such that said sprinkler head outlet means is communicated with the sprinkler head assembly, operating means mounted on said accessing structure for movement from an inoperative position into an operative position in resposne to the communication of water under pressure therewith, means for communicating a source of water under pressure with said operating means to thereby effect movement of said operating means from said inopeative position into said operative position, and second detachable means operatively associated with said water pressure communicating means for conveniently manually detachably connecting said water pressure communicating means with the access assembly in a relationship such that access to water under pressure within the chamber means of the access assembly for communication with the said operating means by said water pressure communicating means can be obtained through pilot pressure outlet means of the access assembly when the pilot pressure valve means thereof is opened.

32. Apparatus as defined in claim 31 wherein said operating means includes a hollow valve actuating member having an open upper end portion slidably sealingly mounted in said sprinkler head outlet means for reciprocating movement between inoperative and operative position, said valve actuating member having a lower end portion adapted to engage and move said main outlet valve means from its closed position into its opened position when said tubular member is moved from its inoperative position into its operative position, the lower end portion of said valve actuating member being configured to communicate water under pressure from said chamber means flowing through said main outlet means with the interior of said valve actuating member.

33. Apparatus as defined in claim 32 wherein the central exterior of said valve actuating member is provided with an annular flange, said annular member including an upper portion fixed to said annular flange and a cylindrical portion extending downwardly from said upper portion.

34. Apparatus as defined in claim 33 wherein said operating means includes coil spring means inwardly of said cylindrical portion operatively engaged with said upper portion for biasing said annular member and said valve actuating member upwardly toward said inoperative position.

35. Apparatus as defined in claim 33 wherein said accessing structure includes (1) an upper housing member having an upper tubular portion providing said sprinkler head outlet means and a lower exterior flange portion and (2) a lower housing member having an upper exterior flange portion fixed to said lower flange portion and a cylindrical wall portion extending downwardly from said upper flange portion.

36. Apparatus as defined in claim 35 wherein said operating means includes a folded rolling seal having (1) an outer end portion sealingly fixed between said upper and lower flange portions and rollingly engaging the interior of the cylindrical wall portion of said lower housing member and (20 an inner end portion sealingly fixed to the annular flange of said valve actuating member and rollingly engaging the exterior of the cylindrical portion of said annular member.

37. Apparatus for enabling an output conduit to be detachably mounted on an input conduit containing water under pressure in accessed relation to the water under pressure within the input conduit, said apparatus comprising:

an access assembly including an access structure providing (1) chamber means for containing water under pressure, (2) inlet means for communicating with said chamber means, (3) main access outlet means for communicating with said chamber means, and (4) pilot pressure outlet means for communicting with said chamber means, means on said access structure for enabling the same to be fixedly mounted on the input conduit in a relationship such that said inlet means is in communication with water under pressure within the inlet conduit, main valve means mounted with respect to said main outlet means for movement between (1) a closed access position preventing water under prssure within said chamber means from flowing through said main outlet means and (2) an opened accessed position enabling water under pressure within said chamber means to flow through said main outlet means, pilot pressure valve means mounted with respect to said pilot pressure outlet means for movement between (1) a closed inoperative position preventing water under pressure within said chamber means from flowing through said pilot pressure outlet means and (2) an opened operative position enabling water under pressure within said chamber means to flow through said pilot pressure outlet means, an accessing assembly including an accessing structure providing output conduit outlet means, means on said accessing structure for enabling an output conduit to be secured on said accessing structure in a relationship such that said output conduit outlet means is communicated with the output conduit, main detachable interengaging means operatively associated between said access and accessing structures for enabling said accessing structure to be conveniently manually secured on said access structure in a relationship such that access to water under pressure within said chamber means can be obtained by movement of said main valve means into its opened position, operating means mounted on said accessing structure for movment from an inoperative position into an operative position in response to the communication of water under pressure therewith to thereby effect movement of said main valve means into its open position and establish communication of water under pressure from said chamber means with said output conduit outlet means through said main outlet means, means for communicating a source of water under pressure with said operating means so as to effect movement thereof from said inoperative position into said operative position, and second detachable interengaging means for conveniently manually effecting a securement of said water pressure communicating means in communicating relation with said pilot pressure outlet means so that access to water under pressure within said chamber means can be obtained for communication with said water pressure communicating means when said pilot pressure valve means is in its opened position.

38. A water pressure access assembly for connection with a conduit containing water under pressure, said water pressure access assembly comprising an access structure providing (1) chamber means for containing water under pressure (2) inlet means for communicating with said chamber means (3) main outlet means for communicating with said chamber means and (4) pilot pressure outlet means for communicating with said chamber means, means on said access structure for enabling the same to be fixedly mounted on the conduit in a relationship such that said inlet means is in communication with water under pressure within the conduit, main valve means mounted with respect to said main outlet means for movement between (1) a closed access position preventing water under pressure within said chamber means from flowing through said main outlet means and (2) an opened accessed position enabling water under pressure within said chamber means to flow through said main outlet means, first detachable means on said access structure for enabling an accessing assembly to be conveniently manually detachably secured to said access structure in a relationship such that access to water under pressure within said chamber means can be obtained by movement of said main valve means into said opened position, pilot pressure valve means mounted with respect to said pilot pressure outlet means for movement between (1) a closed inoperative position preventing water under pressure within said chamber means from flowing through said pilot pressure outlet means and (2) an opened operative position enabling water under pressure within said chamber means to flow through said pilot pressure outlet means, and second detachable means on said access structure for enabling a pilot pressure communicating means of the accessing assembly to be conveniently manually detachably secured with said access structure in a relationship such that access to the water under pressure within said chamber means can be obtained through said pilot pressure outlet means when said pilot pressure valve means is in said opened position so as to enable the pilot pressure communicating means of the accessing structure to effect movement of said main valve means into said opened accessed position.

39. A water pressure accessing assembly for connection with an output conduit for enabling the output conduit to be selectively connected with an input conduit containing water under pressure in accessed relation to the water under pressure therein, said water pressure assembly comprising:

an accessing structure providing an output conduit outlet means, first detachable means on said accessing structure for enabling said accessing assembly to be conveniently manually detachably secured to a riser pipe mounted access assembly having chamber means communicating with a main outlet means controlled by main valve means and a pilot pressure outlet means controlled by pilot pressure valve means in a relationship such that access to water under pressure within the chamber means through the main outlet means of the access assembly can be obtained when the main valve means of the access assembly is opened for communication with said output conduit outlet means, means on said accessing structure for engaging an output conduit to be secured on said accessing structure in a relationship such that said output conduit outlet means in communicated with the output conduit, operating means mounted on said accessing structure for movement from an inoperative position into an operative position in response to the communication of water under pressure therewith, means for communicating a source of water under pressure with said operating means to thereby effect movement of said operating means from said inoperative position into said operative position, and second detachable means operatively associated with said water pressure communicating means for conveniently manually detachably connecting said water pressure communicating means with the access assembly in a relationship such that access to water under pressure within the chamber means of the access assembly for communication with the said operating means by said water pressure communicating means can be obtained through pilot pressure outlet means of the access assembly when the pilot pressure valve means thereof is opened.

40. A method of temporarily connecting separate accessing structure with access structure having a main outlet and a pilot pressure outlet so as to communicate fluid under pressure contained within said access structure with said accessing structure through the main outlet of said access structure which comprises the steps of manually establishing a mechanical connection of said accessing structure with said access structure without establishing communication of the fluid under pressure contained in said access structure with said accessing structure through said main outlet, manually establishing a controllable pilot pressure flow path through the pilot pressure outlet to said accessing structure for fluid under pressure contained within said access structure, and utilizing fluid under pressure communicated to said accessing assembly through said pilot pressure flow path as a power source to establish communication of the fluid under pressure contained in said access structure with said accessing structure through said main outlet.

41. A method as defined in claim 40 wherein the manually established mechanical connection of said accessing structure with said access structure is less rigid than the rigidity finally required and utilizing the fluid under pressure communicated to said accessing assembly through said pilot pressure flow path as a power source to rigidify the manually established mechanical connection to the rigidity finally required.

42. Apparatus for obtaining temporary access to fluid under pressure comprising access struture for containing the fluid under pressure having a main outlet and a pilot pressure outlet, accessing structure separate from said access structure cooperable therewith to obtain temporary access to the fluid under pressure contained in said access structure, main interengaging means for manually establishing a mechanical connection of said accessing structure with said access structure without establishing communication of the fluid under pressure contained in said access structure with said accessing structure through said main outlet, pilot interengaging means for manually establishing a pilot pressure flow path through the pilot pressure outlet to said accessing structure for fluid under pressure contained within said access structure, and means for utilizing fluid under pressure communicated to said accessing assembly through said pilot pressure flow path as a power source the establish communication of the fluid under pressure contained in said access structure with said accessing structure through said main outlet.

43. Apparatus as defined in claim 42 wherein the manually established mechanical connection of said accessing structure with said access structure is less rigid than the rigidity finally required, and said fluid pressure utilizing means also functions to utilize the power source to rigidify the manually established mechanical connection to the rigidity finally required.

44. A method of temporarily connecting separate fluid accessing structure in rigid fluid communicating relation with successive spaced access structures containing fluid under pressure, which comprises the steps of manually establishing an initial mechanical connection of said accessing structure with a first one of said spaced access structures which is (1) less rigid than that finally required and (2) non-fluid communicating, utilizing a portion of the fluid under pressure contained in said first access structure as a power source to (1) rigidify the initial mechanical connection to that finally required and (2) establish communication of the fluid under pressure in said access structure with said accessing structure, ceasing the utilization of said portion of fluid under pressure as a power source and restoring the initial mechanical connection of said accessing structure with said first access structure, manually separating said accessing structure from the initial mechanical connection with said first access structure, manually establishing an initial mechanical connection of said accessing structure with a second one of said spaced access structures which is (1) less rigid than that finally required and (2) non-fluid communicating, utilizing a portion of the fluid under pressure contained in said second access structure as a power source to (1) rigidify the initial mechanical connection to that finally required and (2) establish full communication of the fluid under pressure in said access structure with said accessing structure.

* * * * *